Jan. 25, 1966  L. REYMOND  3,230,851
DEVICE FOR CHECKING THE FOCUS OF A SCENE-SHOOTING OBJECTIVE
Filed June 4, 1963  3 Sheets-Sheet 1

Jan. 25, 1966    L. REYMOND    3,230,851
DEVICE FOR CHECKING THE FOCUS OF A SCENE-SHOOTING OBJECTIVE
Filed June 4, 1963    3 Sheets-Sheet 2

United States Patent Office 3,230,851
Patented Jan. 25, 1966

3,230,851
DEVICE FOR CHECKING THE FOCUS OF A SCENE-SHOOTING OBJECTIVE
Lucien Reymond, Paris, France, assignor to Societe d'Optique et de Mecanique de Haute Precision, Paris, France, a company of France
Filed June 4, 1963, Ser. No. 285,277
Claims priority, application France, June 6, 1962, 899,913; Dec. 7, 1962, 917,919
8 Claims. (Cl. 95—42)

It is customary for a photographic or cinematographic objective to be coupled to a reflex viewfinder enabling that part of the image corresponding exactly to that formed on the film to be seen at any instant within the limits of a frame of suitably calculated dimensions. For this purpose, it is sufficient to interpose a mirror of low reflecting power in an air space following one of the lenses of the objective, the mirror being sufficiently transparent to allow most of the incident light to pass directly through and form the image on the film, but sufficiently reflective to deflect the remainder of this light laterally, after any other reflection which may occur, into the viewfinder coupled to the objective, within which viewfinder the light forms a true image limited by the frame provided for this purpose.

Moreover, the variable distance of the subject to be photographed is taken into account in combinations of this kind by displacing the first lens of the objective along the optical axis, or more generally by so displacing a group of lenses situated in front of the reflex mirror, so that when correct focus is attained the image which tends to form in the space where the said mirror is disposed is in a plane of unvarying position, whatever the distance of the subject. The same clearly applies to the corresponding true image which is formed inside the viewfinder. It is then convenient to dispose the frosted face of a sheet of glass in the fixed plane which this image is intended to occupy. When correct focus has not been attained, the plane of the image departs from this frosted face, on which each point of the image is replaced by a blur whereof the size increases with an increase in the error in focussing, and with an increase in the amount of opening in the beam which converges on this point of the image. All that need then be done is to displace the lens which serves to focus the objective until the image on the frosted surface again becomes as clear as possible.

This known device exhibits two disadvantages:
First of all, in order to allow of sufficient accuracy in focussing, it requires that the cones of rays forming the various points of the image on the frosted surface be sufficiently open, with a resultant increase in the diameter of the lenses making up the viewfinder and greater difficulty in correcting for aberrations. Furthermore, passing through the frosted surface diffuses the light in all directions, so that only a small fraction of the light reaches the observer's eye, with the result that the viewfinder cannot be very brightly illuminated.

The present invention has the object of avoiding these disadvantages. It resides in replacing the reflex mirror by two small reflecting surfaces a few square millimetres in area and in subjecting the pencils of rays which encouter them to a certain number of reflections, even or odd for both, until the axes of these pencils become superimposed, one being reflected on a surface having a reflecting power of about 50%, while the other passes directly through this same surface by reason of transparency.

When the focus is correct, the two pencils whereof the axes have been thus merged contribute to the formation of the same image seen through the viewfinder. On the contrary, when focus is not correct, displacement along the optical axis of the objective is imparted to the plane of the image wherein the axes of the said pencils intersect before undergoing their various reflections. These axes consequently have their directions altered in opposite senses, and after reflection are at an angle to one another which increases with an increase in the error of focussing. They thus give rise to two distinct images which, when seen through the viewfinder, produce an effect of duplication. This aspect is independent of accommodation by the eye, so that there is no need to use a frosted glass, thus avoiding light loss by diffusion. All that need be done to restore correct focus is to displace the first lens of the scene-shooting objective until the clearest possible image is obtained and the duplication observed is caused to disappear. The degree of accuracy increases with the distance in the direction perpendicular to the optical axis of the objective between the two small reflecting surfaces which replace the reflex mirror, and does not depend in any way on the opening of the pencils reflected by the said surfaces, which opening can remain very small and thus enable a good-quality image to be obtained with quite simple lenses not of excessive diameter.

It is preferable for the small reflecting surfaces to be placed in front of the variable-aperture diaphragm which regulates the admission of light, so that closure of this diaphragm cannot block the passage of rays intended to be reflected by these surfaces.

The device for checking the focus of a scene-shooting objective by examining the image observed through a viewfinder of the reflex type coupled to the said objective according to the invention is characterised in that the device comprises two small reflecting surfaces having a reflecting power of substantially 100% and spaced from one another in the direction perpendicular to the optical axis of the objective, the axes of the pencils of light received by these surfaces, which are the straight lines joining the centres of these latter to the point on the optical axis of the objective where the centre of the image tends to be formed in the intermediate medium in which the device is situated, undergoing a certain number of reflections on plane reflecting surfaces, even or odd in both cases, until they become superimposed when correct focus is attained, one passing directly through a last surface which is both transparent and 50% reflecting, while the other is reflected on this surface.

The invention may be embodied in various forms, but it is convenient to use a sheet of glass or other transparent material whereof the parallel faces are disposed perpendicularly to the optical axis of the objective, this sheet being made up of various portions cemented to one another on plane faces, thus enabling the latter to be provided, before cementing, with a deposit of silver (or other reflecting material) limited to the desired dimensions.

The invention will now be described in greater detail with reference to some forms of embodiment which are given by way of example and illustrated in the drawings.

FIGURE 1 diagrammatically illustrates the principle of the invention;

Figure 1:
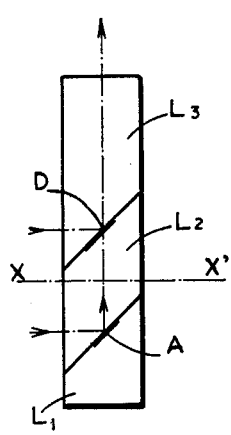
Figure 2:
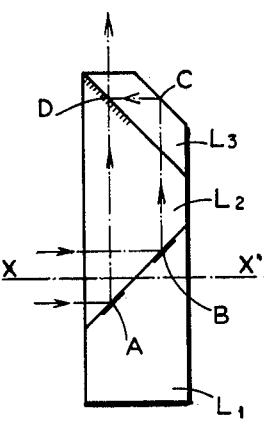
FIGURES 2 to 5 illustrate variants in embodiment of the invention.
Figure 9:
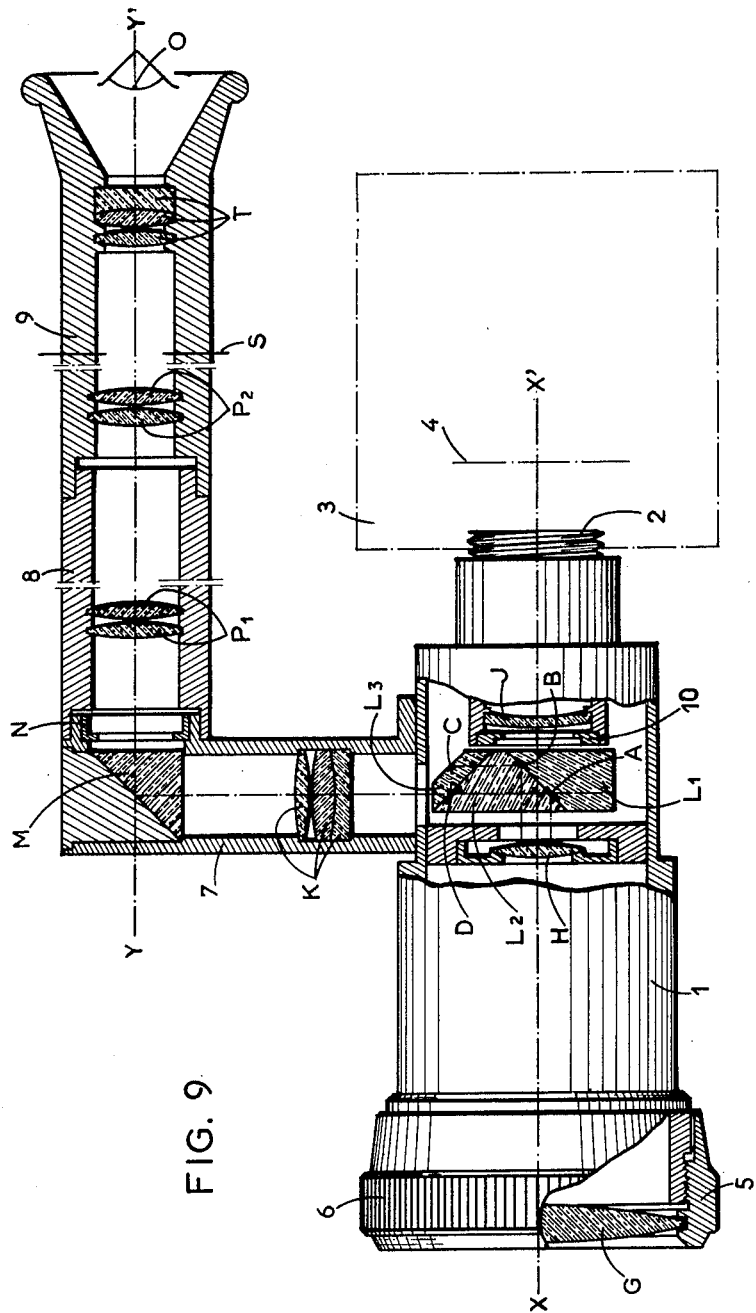
FIGURE 9 illustrates a part-section through an objective comprising a reflex viewfinder and a focussing device according to the invention.

FIGURE 10 diagrammatically illustrates the objective shown in FIGURE 9;

The simplest case is that in which the image which tends to be formed in the air space in which the sheet is situated is rejected at infinity, in which case the axes of the pencils received by the small reflecting surfaces and corresponding to the centre of the field are both parallel to the optical axis of the objective. A first example is illustrated in FIGURE 1. The sheet is made up of the three portions $L_1$, $L_2$, $L_3$ cemented to one another on mutually parallel faces inclined at 45° with respect to the optical axis X—X' of the objective. Of these faces, one carries the small surface centred on A, of about 100% reflecting power, and the other the small surface, centred on D, which is both reflecting and 50% transparent, the straight line AD being perpendicular to the axis X—X'. The axis of the pencil which is reflected at A is directed along AD, and passes without deflection through the small semi-reflecting surface centred on D, while the axis of the other pencil is reflected at D and merges, in extension of AD, wiht the axis of the first pencil which was reflected at A. In this solution it will be noted that, upon emerging from the sheet, the images of the points A and D are staggeerd along the comomn axis of the emergent pencil, which does not involve any disadvantages whatever. But arrangements may be made for these images to coincide, as the example in FIGURE 2 shows.

In this second example, the sheet is again split up into three portions $L_1$, $L_2$, $L_3$ cemented to one another. The face on which the two portions $L_1$, $L_2$ are cemented, and which is inclined at 45 degrees with respect to the optical axis X—X' of the objective carries the two small surfaces, centred on A and B, which have a reflecting power of about 100%. The axes of the pencils, which arrive at A and B respectively parallel to the optical axis X—X', are deflected perpendicularly to this axis along AD and BC. The first passes directly at the point D through the face on which the portions $L_2$, $L_3$ are cemented, which is perpendicular to the face on which the portions $L_1$, $L_2$ are cemented, and carries about the point D a part which is both transparent and 50% reflecting. As regards the axis of the other pencil which, after reflection at B, is directed along BC parallel to AD, it passes through the face on which the portions $L_2$, $L_3$ are cemented outside its semi-reflecting part, and encounters one external face of the 3rd portion at C, parallel to that which carries the semi-reflecting part. It then assumes the direction CD perpendicular to BC and is reflected at D on the semi-reflecting surface, which deflects it into an extension of AD, along which the axes of the two pencils are then merged when correct focus is attained. Since the path AD is equal to the sum BC+CD, it follows that the images of the points A and B coincide upon emerging from the strip.

In these two examples, some faces on which the portions are cemented intersect the parallel faces of entry to and exit from the sheet along portions of straight lines slightly removed from the optical axis X—X' of the objective when this sheet is not very thick, so that they fall inside the beam of light which passes through any objective on its way to form the image on the film. This may result in manufacturing difficulties, since this image runs the risk of being upset if the portions separated by the cementing faces in question have not precisely the same refractive index.

Figure 3:
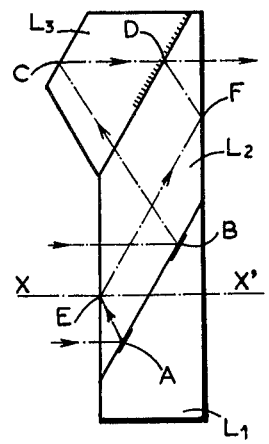

This disadvantage may be obviated by using the device illustrated in FIGURE 3, wherein the sheet still comprises three portions $L_1$, $L_2$, $L_3$, but the face on which the portions $L_1$, $L_2$ are cemented, and which carries the two small reflecting surfaces centred on A and B, is inclined at 60° with respect to the optical axis X—X' of the objective, and is parallel to the face on which the portions $L_2$, $L_3$ are cemented. The axis of the pencil which is reflected at A then undergoes two total reflections at E and F on the entry and exit faces of the sheet which are perpendicular to X—X', and then a fourth reflection at D on the face on which the portions $L_2$, $L_3$ are cemented, and which carries about D a part which is both transparent and 50% reflecting. Finally, the axis of this pencil emerges from the sheet parallel to X—X'. As for the axis of the pencil which is reflected at B, it passes without deflection through the face on which the portions $L_2$, $L_3$, are cemented, outside its semi-reflecting part, and then undergoes a second reflection on an external face of the portion $L_3$ parallel to the cementing face, so that it assumes the direction CD parallel to the optical axis X—X' and passes at D through the semi-reflecting surface, to become superimposed on the axis of the first pencil, which has been reflected four times at A, E, F and D. In the example illustrated, the paths AE+EF+FD and BC+CD are equal, so that the images of the points A and B coincide upon emerging from the sheet, although this condition is not indispensable.

Embodiment of the invention is a little more critical when the image which tends to be formed in the air space where the sheet is situated is at a finite distance, in which case the axes of the two pencils are no longer parallel to the optical axis X—X' of the objective, but intersect at a point P on this axis situated in the plane in which the image in question tends to be formed. Arrangements must then be made not only that the axes of the said pencils, when the point P is in its correct position, become superimposed after having cleared the last semi-reflecting surface, one by reflection and the other by transparency, but also that the images of the point P corresponding to each of the two pencils assume the same position on the common axis of the merged pencils (which was always attained in the case of an image at infinity).

Figure 4:
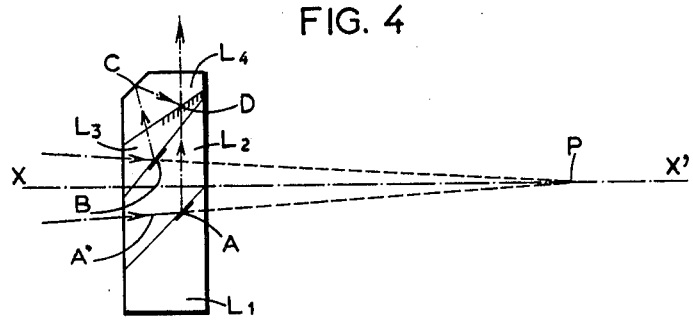

A first example of this case is illustrated in FIGURE 4. This time, the sheet comprises four portions $L_1$, $L_2$, $L_3$ and $L_4$. The small reflecting surfaces centred on A and B, whereof the reflecting power is in the region of 100%, are respectively carried in the first case by the face on which the portions $L_1$, $L_2$ are cemented, and in the second case by the face on which the portions $L_2$, $L_3$ are cemented. The axes of the pencils are the straight lines joining the points A and B respectively to the point P on the optical axis X—X' where the image corresponding to the centre of the field tends to be formed. When correct focus is attained, the axis of the first pencil which is reflected at A assumes the direction AD perpendicular to X—X', the face on which the portions $L_1$, $L_2$ are cemented being the plane which bisects the angle PAD. After having cleared the face on which the portions $L_2$, $L_3$ are cemented, outside the part which carries the small reflecting surface centred on B, it passes at D through the face on which the portions $L_3$, $L_4$ are cemented, which comprises about the point D a part which is both transparent and 50% reflecting. The axis of the second pencil which is reflected at B assumes the direction BC, and, after having passed through the face on which the portions $L_3$, $L_4$ are cemented outside its semi-reflecting part, it is reflected at C on an external face of the portion $L_4$, and is then directed along CD, to be finally reflected at D on the semi-reflecting surface carried by the face on which the portions $L_3$, $L_4$ are cemented, and subsequently merges with the extension of AD. The arrangement is such that, if the point A' is marked on the straight line AP in such a way that PA'=PB, the two paths A'A+AD on the one hand and BC+CD on the other hand are equal, which ensures that the images of the point P corresponding to each of these two paths will coincide when focus is correct, that is to say when the point P is in fact in the position which must impart this focus to it. But the images of the points A and B do not coincide on the common axis of the merged pencils, being offset by an amount equal to AA', which is not of any great importance. In order to avoid this offset without impairing coincidence of the images of the point P, PA would have to be equal to PB, that is to say A would have to assume the position A'. But then, if the pencil on the axis A'P is to be capable of being reflected along A'B, which is normal to the optical axis X—X', some hindrance is encountered due to the presence of the small reflecting surface centred on B through which it must pass.

Figure 5:
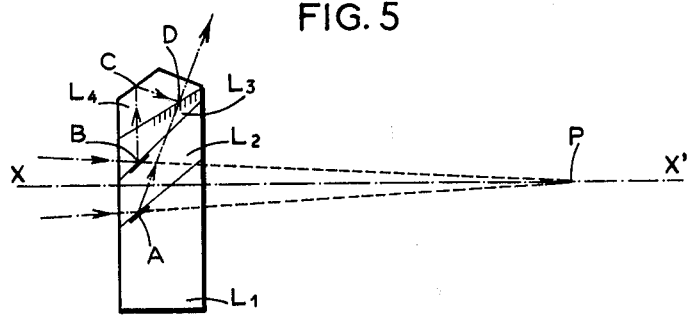

The example in FIGURE 5 illustrates a slightly different arrangement which avoids this difficulty, and ensures that the images of the point P and those of A and B coincide. The sheet still comprises the four portions $L_1$, $L_2$, $L_3$ and $L_4$, as in the foregoing example, and the centres A and B of the small reflecting surfaces, one carried by the face on which the portions $L_1$, $L_2$ are cemented, and the other by the face on which the portions $L_2$, $L_3$ are cemented, are such that PA=PB. In this arrangement, however, the face on which the portions $L_1$, $L_2$ are cemented is inclined in such a way that the axis of the pencil directed along AP is reflected at A, assumes the direction AD, and makes a sufficient angle with respect to the normal AB to the optical axis X—X' for the pencil in question to pass through the surface on which the portions $L_2$, $L_3$ are cemented outside the small reflecting surface centred on B. The axis of this pencil then passes at D through the face on which the portions $L_3$, $L_4$ are cemented, which comprises about the point D a part which is both transparent and 50% reflecting, and continues along the extension of AD. As for the axis of the second pencil which arrives at B in the direction BP, it is reflected at this point on the small reflecting surface centred on B, and is deflected along BC, which is for example perpendicular to the optical axis X—X', as in the figure. It then passes through the face on which the portions $L_3$, $L_4$ are cemented outside the semi-reflecting part, and is then reflected at C on an external face of the portion $L_4$, which returns it along CD, and it undergoes a third reflection at D on the semi-reflecting part of the face on which the portions $L_3$, $L_4$ are cemented, to be finally directed along the extension of AD, where, when correct focus is attained, it merges with the axis of the first pencil, which has undergone a single reflection at A. The arrangement is such that the two paths AD and BC+CD are equal, which ensures that the images of the point P coincide on the axes merged with the extension of AD, and at the same time that the images of A and B coincide since PA has moreover been taken as equal to PB.

Some difficulties may be encountered in producing a layer of suitable thickness, by depositing silver or aluminium for example, enabling the same light intensity to be obtained by reflection and by transparency.

Figure 8:
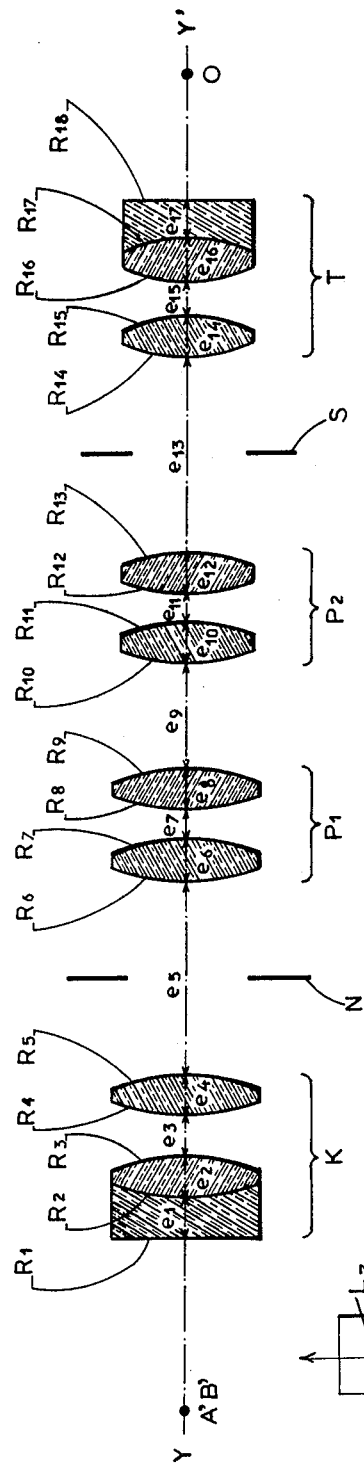
FIGURES 6 to 8 illustrate variants in embodiment concerning the make-up of the transparent and reflecting surface.
Figure 8:
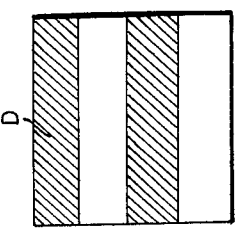
Figure 7:
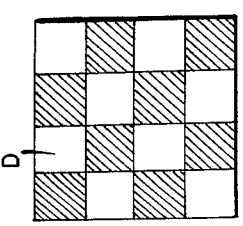
Figure 6:
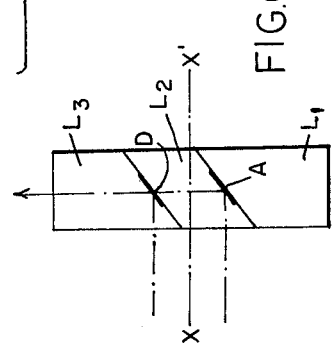

The forms of embodiment illustrated in FIGURES 6 to 8 allow of the production of surfaces which can give a reflected pencil having the same intensity as the pencil which passes through the surface by transparency.

According to the invention, the surface which is both transparent and reflecting takes the form of a surface comprising totally reflecting parts and totally transparent parts, each of these two categories of parts taken together being of substantially equal surface area.

FIGURE 6 illustrates one form of embodiment of the device enabling the focus of a scene-shooting objective to be checked. This device comprises three portions $L_1$, $L_2$ and $L_3$ cemented to one another on mutually parallel faces which are inclined at 45 degrees with respect to the optical axis X—X' of the objective.

One of these faces carries a small surface A having a reflecting power in the region of 100%, and the other carries a small surface D which serves both to reflect and transmit light.

The axis of the pencil which is reflected on the surface A is directed along A–B, and passes without deflection through the small surface D, while the axis of the other pencil is reflected at D, and then merges with the extension of the pencil emanating from A.

In order that the device may operate under satisfactory conditions, it is essential for the intensity of the pencil of light reflected on D to be the same as the intensity of the pencil of light which emanates from A and has passed through D.

In the foregoing forms of embodiment, the surface D took the form of a 50% semi-reflecting coating. In the forms of embodiment in FIGURES 6 to 8, the surface D, instead of being semi-reflecting and transparent, comprises some totally reflecting parts, that is to say having a reflecting power in the region of 100%, using an opaque deposit, while the other parts are devoid of deposit and are substantially 100% transparent.

The total surface area of the reflecting parts taken together must naturally be substantially equal to that of the transparent parts.

Under these conditions, the emergent pencil, made up of the incident pencils taken together, is no longer an intimate mixture of the light rays emanating from the two pencils, but is formed by the juxtaposition of small portions belonging to the one and the other respectively. There is no modification in the properties and method of utilizing the device as regards the use for which it is intended.

The surface may be split up into reflecting and transparent parts in any way whatever. Some forms of splitting up are illustrated by way of example in FIGURES 7 and 8.

In these figures, the hatched parts represent the reflecting parts, and the parts left white those which are transparent.

FIGURE 7 shows, for example, the surface split up into squares, while FIGURE 8 shows splitting up into parallel strips.

If required, totally different forms of splitting up might be adopted, for example using alternately reflecting and transparent concentric rings.

One particular very simple case resides in replacing the small semi-reflecting surface D by a single totally reflecting surface bounded by a line, such as a portion of straight line, passing through the axis of the overall emergent pencil.

This overall pencil is then made up by juxtaposition of two portions in contact by way of a common surface and emanating from two initial pencils whereof one is reflected on the surface, while the other passes directly through the transparent part contiguous with this surface.

Moveover, in order as far as possible to avoid light losses in making up the image on the sensitive film of the scene-shooting appliance, it is desirable to make the reflecting portions of the surface or surfaces preceding the surface D as small as possible.

In order to attain this object, the preceding surfaces, and in the case of FIGURE 6 the surface A, are split up into totally reflecting parts and totally transparent parts. It is naturally necessary for the surface (not illustrated) associated with the pencil which is reflected on the surface D to have reflecting parts in agreement with those of the surface D, while the surfaces, such as A, associated with the pencil which passes by reason of transparency through the surface D should have their reflecting parts in agreement with the transparent parts of the surface D.

By way of a complete example of embodiment, FIGURE 9 diagrammatically illustrates a longitudinal part-section of a unit made up of a reflect viewfinder coupled to a variable-focus scene-shooting objective of known type, this unit being equipped with the focus-checking device according to the invention, using the solution shown in FIGURE 2.

The body 1 of the scene-shooting objective comprises a thread at 2 by means of which it can be screwed on to the camera 3, so that this objective will form an image of the subject to be photographed in the plane 4, which is that of the film. The size of this image may be varied by known means by displacing some of the lenses of the objective along the optical axis X—X' thereof, the said lenses not being visible in the figure and being situated between the first lens G and the lens H. The first lens G is fixed in a mount 5 which can be screwed to a greater or lesser degree into the body 1 by operating it by the milled external part 6 so as to attain focus on a subject situated at any distance, the effect of this operation being to bring the intermediate image of the subject formed in the air medium situated after the lens H constantly to infinity. This image is then conveyed into the plane 4 by a group of lenses whereof only the first, J, is visible in the figure, the local image plane of the said group coinciding with the plane 4 of the film.

Between the lenses H and J there is sufficient air space to accommodate the sheet comprising parallel faces which are perpendicular to the optical axis X—X' of the objective, this sheet being made up of the three portions $L_1$, $L_2$, $L_3$, cemented to one another for example by Canada balsam, in such a way as to reproduce the arrangement shown in FIGURE 2. The face on which the portions $L_1$, $L_2$ are cemented, which is inclined at 45 degrees with respect to the axis X—X', carries the small surfaces centered on A and B having a reflecting power in the region of 100% or equal to 100%. The face on which the portions $L_2$, $L_3$ are cemented, which is perpendicular to the foregoing, carries the small surface centered on D, both reflecting and 50% transparent, which mixes the pencils of light, one passing directly through the said surface by reason of transparency after having undergone a first reflection on the small surface centred on A, while the other is reflected on the same said surface after having undergone a first reflection on the small surface centred on B, and then a second reflection on an external face of the portion $L_3$ parallel to its cementing face, in the part surrounding the point C. When correct focus has been attained as has been hereinbefore explained, the image of the subject which is formed in the medium separating the lenses H and J is at infinity. Under these conditions, after having cleared the surface centred on D the pencils of light emanating from any common point on the subject, and reflected respectively on the two small surfaces centred on A and B, are superimposed and correspond to images precisely merged at infinity. For the point on the subsect situated on the axis X—X' of the objective, the optical axes of these pencils coincide with the straight line AD perpendicular to the axis X—X' and to the exit face of the portion $L_3$.

These pencils then enter the viewfinder whereof the body is made up of the three pieces 7, 8 and 9 fitted one into the other, the piece 7 being fixed to the body 1 of the scene-shooting objective. The viewfinder comprises:

The objective K made up of a cemented doublet and a simple lens;

The prism M whereof the reflecting face inclined at 45 degrees with respect to the axis AD imparts to the latter an image merged with the optical axis Y—Y' of the viewfinder disposed parallel to the axis X—X';

The frame N situated in the focal image plane of the objective K and whereof the outline defines an image exactly in agreement with that which is recorded on the film;

The carriage in two parts $P_1$, $P_2$, each made up of two simple lenses, which reverses the image given by the objective K and conveys it into the plane S, this plane coinciding with the front focal plane of the eyepiece;

Finally the eyepiece T, made up of a simple lens and a cemented doublet.

The arrangement is such, as has been explained in connection with FIGURE 2, that the centers A and B of the two small reflecting surfaces have images merged after passing through the sheet $L_1$, $L_2$, $L_3$. Corresponding thereto, after passing through the eyepiece T, there is a common final true image situated at the point O on the optical axis Y—Y' of the viewfinder where the observer's eye is placed. The viewfinder having a magnification in the vicinity of 1.4, and the small surfaces centered on A and B having dimensions of the order of 2 to 3 mm., it follows that their images on the commin centre O are entirely contained in the pupil of the observing eye, so that no ray of light emerging from the sheet $L_1$, $L_2$, $L_3$ is lost.

In order that the focus may be checked whatever aperture is being used with the scene-shooting objective, the diaphragm comprising an iris 10 which regulates this aperture is placed after the sheet $L_1$, $L_2$, $L_3$, and slightly in front of the lens J. In this way, even though this diaphragm is closed as far as possible, it does not prevent light emanating from the subject from encountering the two small surfaces centered on A and B, on which it is reflected.

The optical formula of the viewfinder described above is shown diagrammatically by FIGURE 10, in which the prism M has been eliminated by replacing the sheet of glass which corresponds to it by an equivalent air space. The numerical data, for which the lengths are indicated in millimetres, appear in the table below. The first column gives the radii of curvature $R_1$, $R_2$, $R_3$, etc. . . . of the successive dioptres in the order in which the light passes through them, and considered as positive when the center of curvature is after the dioptre with respect to the direction in which the light is propagated. The second column gives the intervals $e_1$, $e_2$, $e_3$ etc. . . . separating the apices of successive dioptre. The third column gives the refraction indices $n_d$ for the radiation $d$ of the glasses forming the various lenses. The fourth column gives, for these same glasses, the values of the quantity $$\gamma = \frac{n_d - 1}{n_F - n_C}$$

which represents the inverse of the dispervise power for the visible spectrum (the spectrum comprises between C and F radiations). Finally, the fifth column gives the useful diameters $\phi_u$ of the successive lenses making up the viewfinder.

| | | | | | |
|---|---|---|---|---|---|
| K | $R_1$=infinity | $e_1$=1.89 | $n_d$=1.7315 | $\gamma$=28.4 | $\phi_u$=13 |
| | $R_2$=+24.3 | $e_2$=5.67 | $n_d$=1.615 | $\gamma$=60 | $\phi_u$=18 |
| | $R_3$=−34.48 | $e_3$=0.1 | $n_d$=1 (air) | | |
| | $R_4$=+92.2 | $e_4$=3.78 | $n_d$=1.615 | $\gamma$=60 | $\phi_u$=18 |
| | $R_5$=−92.2 | $e_5$=60.74 | $n_d$=1 (air) | | |
| $P_1$ | $R_6$=+62 | $e_6$=2.4 | $n_d$=1.615 | $\gamma$=60 | $\phi_u$=17 |
| | $R_7$=−62 | $e_7$=0.1 | $n_d$=1 (air) | | |
| | $R_8$=+62 | $e_8$=2.4 | $n_d$=1.615 | $\gamma$=60 | $\phi_u$=17 |
| | $R_9$=−62 | $e_9$=58.81 | $n_d$=1 (air) | | |
| $P_2$ | $R_{10}$=+88.3 | $e_{10}$=3.3 | $n_d$=1.615 | $\gamma$=60 | $\phi_u$=25.5 |
| | $R_{11}$=−88.3 | $e_{11}$=0.1 | $n_d$=1 (air) | | |
| | $R_{12}$=+88.3 | $e_{12}$=3.3 | $n_d$=1.615 | $\gamma$=60 | $\phi_u$=25.5 |
| | $R_{13}$=−88.3 | $e_{13}$=71.04 | $n_d$=1 (air) | | |
| T | $R_{14}$=+92.2 | $e_{14}$=3.78 | $n_d$=1.615 | $\gamma$=60 | $\phi_u$=20.2 |
| | $R_{15}$=−92.2 | $e_{15}$=0.1 | $n_d$=1 (air) | | |
| | $R_{16}$=+34.48 | $e_{16}$=5.67 | $n_d$=1.615 | $\gamma$=60 | $\phi_u$=20.2 |
| | $R_{17}$=+24.3 | $e_{17}$=1.89 | $n_d$=1.731 | $\gamma$=28.4 | $\phi_u$=20.2 |
| | $R_{18}$=infinity | | | | |

The following will, moreover, be noted, in the diagram in FIGURE 7:

The merged points A' and B', representing the common image of the points A and B which is formed on the optical axis Y—Y' of the viewfinder and is situated, in the air medium preceding the dioptre $R_1$, at 31.88 in front of this dioptre;

The plane N which is that of the frame limiting the image given by the objective K, and is at 36.49 after the dioptre $R_5$ (interval evaluated in air);

The plane S which coincides with the front focal plane of the eyepiece T, and into which the image given by the objective K is conveyed by the carriage $P_1$, $P_2$, this plane being situated 34.56 after the dioptre $R_{13}$;

The point O on the axis Y—Y' where the final true common image of the two points A and B is formed, and which is after the eyepiece at 31.88 from the dioptre $R_{18}$.

The foregoing examples are naturally not limitative, and it is possible either to modify the reflection angles or to make up other equivalent combinations of reflections without departing from the scope of the invention.

I claim:
1. Device for checking the focus of a scene-shooting objective by examining the image observed through a viewfinder of the reflex type coupled to the said objective, characterised in that the device comprises two small reflecting surfaces having a reflecting power of substantially 100% and spaced from one another in the direction perpendicular to the optical axis of the objective, the axes of the pencils of light received by these surfaces being straight lines joining the centers of these surfaces to the point on the optical axis of the objective where the center of the image tends to be formed in the medium in which said surfaces are situated, a plurality of plane reflecting surfaces receiving the reflected pencils of light from said small surfaces and so disposed that the axes of the reflected pencils of light come into coincidence when correct focus is obtained, one pencil passing directly through a last surface of said plurality of plane reflecting surfaces, said last surface being both transparent and 50% reflecting, and the other pencil being reflected on said last surface, said plurality of plane reflecting surfaces being located on faces of portions of transparent material cemented to one another and constituting a parallel-faced sheet perpendicular to the optical axis of the objective.

2. The device according to claim 1 in which the axes of the two pencils are directed parallel to the optical axis of the objective, and are respectively reflected on two small surfaces having a reflecting power of substantially 100% both carried by the face on which the first two portions are cemented and which is inclined at 45 degrees with respect to the optical axis of the objective, the axis of one of these pencils then passing through a surface which is both transparent and 50% reflecting carried by the cementing face of a third portion disposed perpendicularly to the face on which the first two are cemented, while the axis of the other pencil undergoes a second reflection on an external face of the third portion parallel to its cementing face, to be reflected for a third time on the semi-reflecting surface so as to become superimposed on the axis of the first pencil when correct focus is attained.

3. The device acocrding to claim 1 in which the axes of the two pencils are directed parallel to the optical axis of the objective, and are respectively reflected on two small surfaces having a reflecting power of substantially 100%, both carried by the face on which the first two portions are cemented and which is inclined at 60 degrees with respect to the optical axis of the objective, the axis of one of these pencils then undergoing two total reflections on the entry and exit faces of the sheet perpendicular to the optical axis of the objective, and then a fourth reflection on a surface which is both reflecting and 50% transparent carried by the cementing face of a third portion, while the axis of the other pencil undergoes a second reflection on an external face of the third portion, and then passes through the semi-reflecting surface to become superimposed on the axis of the first pencil when correct focus is attained, the images of the centers of the two small surfaces coinciding upon emerging.

4. The device according to claim 1 in which the parallel-faced sheet is made up of four successive portions, the face on which the first two portions are cemented and the face on which the third is cemented to the second carrying respectively said two small surfaces having a reflecting power of substantially 100% on which the two pencils are reflected, the axis of the first pencil then passing through said surface which is both transparent and 50% reflecting carried by the face on which the fourth portion is cemented to the third portion, while the axis of the second pencil undergoes a second reflection on an external face of the fourth portion to be reflected for a third time on said semi-reflecting surface, after which the second pencil becomes superimposed on the axis of the first pencil when correct focus is attained, the paths traversed by each of the axes of the two pencils in said sheet after reflection on said two small surfaces being substantially equal in length whereby the points, at which are formed resepctively, the images of the point where the axes of the two pencils entering said sheet meet on the optical axis of said objective, coincide upon emerging from the device when correct focus is attained.

5. Device for checking the focus of a scene-shooting objective by examining the image observed through a view finder of the reflex type coupled to said objective comprising two small reflecting surfaces having a reflecting power on the order of 100% and located on opposite sides of the optical axis of said objective, the axes of the pencils of light received by said surfaces, which are straight lines joining the centers of said surfaces to the point on the optical axis of said objective where the center of the image tends to be formed in the medium where said surfaces are situated, undergoing reflections of the same order for each of said surfaces and a half transparent and half reflecting last surface, one of said reflecting pencils of light passing directly through said last surface and the other of said reflected pencils of light being reflected by said last surface, the axes of said pencils of light from said last surface coming into coincidence when correct focus is obtained.

6. The device according to claim 5 in which the points where the axes of the two pencils encounter, respectively, the first reflecting surface are equidistant from the point where they intersect on the otpical axis of the objective whereby when correct focus is attained, the images of the centers of the two surfaces and the images of the point where the axes of the pencils intersect on the optical axis of the objective are simultaneously merged on the common axis of the two emergent pencils when correct focus is attained.

7. The device according to claim 5 in which the last surface is both reflecting and transparent and is a surface having totally reflecting parts and totally transparent parts, the total surface of each of these two parts being substantially equal.

8. The device according to claim 5 including reflecting surfaces disposed in the paths of the pencils of light before the last transparent and reflecting surface comprising totally reflecting parts and totally transparent parts so disposed that the surfaces disposed in the path of the pencil which is reflected on the last surface comprise reflecting parts corresponding to those of said last surface, and the surfaces disposed in the path of the pencil which passes through the last surface comprise reflecting parts corresponding to the transparent parts of said surface.

References Cited by the Examiner

German printed application, 1,108,066, May 31, 1961.
German printed application 1,129,295, May 10, 1962.

JOHN M. HORAN, *Primary Examiner.*